United States Patent [19]

Schram et al.

[11] Patent Number: 4,706,335
[45] Date of Patent: Nov. 17, 1987

[54] HOG SPLITTER

[75] Inventors: Harlan L. Schram, Spring Lake; Gerald L. O'Neil, Rockford, both of Mich.

[73] Assignee: Wolverine World Wide, Inc., Rockford, Mich.

[21] Appl. No.: 915,729

[22] Filed: Oct. 3, 1986

[51] Int. Cl.$^4$ ............................................. A22B 5/20
[52] U.S. Cl. ..................................................... 17/23
[58] Field of Search ............................................. 17/23

[56] References Cited

U.S. PATENT DOCUMENTS 3,310,085  3/1967  Burch .
3,402,426  9/1968  Wexel ..................................... 17/23
4,337,550  7/1982  Baylor et al. ........................... 17/23

FOREIGN PATENT DOCUMENTS 0067331  12/1982  European Pat. Off. ................ 17/23

Primary Examiner—Willie G. Abercrombie
Attorney, Agent, or Firm—Price, Heneveld, Cooper, DeWitt & Litton

[57] ABSTRACT

There is disclosed a carcass back splitting machine having a multifaceted carrousel that supports, retains and advances carcasses through successive stations including an entry station, a splitting station and a discharge station. Each facet has carcass receiving and retention means including two sets of vertically arranged retractable suction cups for engaging the two sides of the carcass, and shifting the carcass into engagement with and in conformity to a configured backstop forming surface. An extensible cutter vertically advances over a configured path down through the carcass backbone but not the adjacent skin.

3 Claims, 4 Drawing Figures

HOG SPLITTER

BACKGROUND OF THE INVENTION

This invention relates to hog carcass splitting.

Hog carcass butchering techniques used for many years involve, after the steps of decapitation, removal of feet, full length slitting along the belly and evisceration, the step of cutting the carcass through the backbone into two halves. From each separate half, or so-called "hog side", the rib cage and loins are pulled, any other cuts of meat taken, and the skin removed from the bacon and fat on the skinning machine. The two pieces of skin can be used for fabrication of footwear or other articles. Actually, it is far preferable to have one large piece of skin from the hog carcass rather than two small ones. Therefore, in recent years, the butchering technique has been modified so that, instead of splitting the carcass into two distinct halves, a highly skilled workman carefully cuts the backbone in two with a power saw, from the inside of the carcass, without cutting through the adjacent skin over the exterior of the backbone. This obviously is a tricky operation involving unusual dexterity and care, and requiring highly skilled personnel. It also involves considerable potential danger to the workman who holds and manipulates the power saw from an elevated hand held position, vertically downward to a low position on the hanging carcass. Even with the greatest of skill and care, however, the skin is too often sliced because of its close proximity to the backbone.

Once this operation is complete, the removal of the rib cage and loins then involves removal of the two parts of the severed backbone therewith. The bacon and fat back remaining on the skin are subsequently separated from the double side skin as on a drum type double side skinner as in U.S. Pat. No. 3,310,085.

Although the assignee herein, a fabricator of articles from the tanned hog skins, much prefers the double side skins to optimize product quality and maximize area of skin usage, packing plants are reluctant to take the added time and care, and to pay skilled personnel to perform the special processing step. Moreover, the manual operation requires adequate time to perform this delicate task, thereby potentially holding up the entire processing line. Packing plants are highly competitive so that any decrease in productivity or any added costs are crucial.

In view of these factors, inventors at the assignee herein developed the special hog splitting apparatus set forth in U.S. Pat. No. 4,337,550. The patented hog splitter employs a tilted upright guide, a vertically traveling stop behind the carcass back, a vertically traveling cutter cooperative therewith, and coordinate drive mechanism for the stop and the cutter. Such apparatus did in fact improve the employee's safety considerably, as well as control the depth of accuracy of hog splitting in contrast to the manual function. However, many packing plant operators were still reluctant to install the machine because, although it had definite advantages, the time required to split the hogs was not sufficiently improved over the manual technique to justify the expenditure.

SUMMARY OF THE INVENTION

This present invention provides a hog splitting machine which not only effects (1) accurately controlled cutting depth through the backbone but not through the skin, (2) greatly improved safety, eliminating the need for manual handling of a power saw swung by the operator, but also (3) greatly reduced splitting time per carcass. All of these are accomplished simultaneously using a unique apparatus and method developed subsequent to that in U.S. Pat. No. 4,337,550. The novel apparatus has inspired enthusiasm in the processing plant where it has been experimentally operated during its development.

Using the novel equipment, the hog carcasses to be split are sequentially advanced around a carousel which rotates through successive infeed, splitting and discharge stations while the carcass is specially retained and controlled.

Two sets of retractable suction cups pull the carcass backbone into engagement with and in conformity to a vertically oriented configurated back stop running the length of the hog, and aligned with the splitting element or saw. The splitting element is cam controlled in its vertical travel to follow the same configurated path as the configurated back stop, thereby splitting the backbone without cutting the adjacent skin.

The retractable suction cups retain the two split carcass portions after splitting, while they are conveyed to the discharge station on the carousel.

Recent testing results under experimental operation in a packing plant have demonstrated effectiveness not only in safety for the workman, and hence lower insurance costs for the packing plant, but also accuracy of cutting depth, and greatly increased reliable production output. The rapid output rate prevents the machine from becoming a bottleneck to stall the processing line in this highly competitive, cost conscious business. Therefore, packing house operators can install it with cost justification, to enable product manufacturers such as the assignee herein to have available the whole skins for more economical manufacture of products. Therefore, the invention provides economical benefits not only for the packing plant, but also for the product manufacturer and for the public in general.

These and several other objects, advantages and features of the invention will become apparent upon studying the following specification in conjunction with the drawings.

DESCRIPTION OF THE PREFERRED EMBODIMENT

Figure 1:
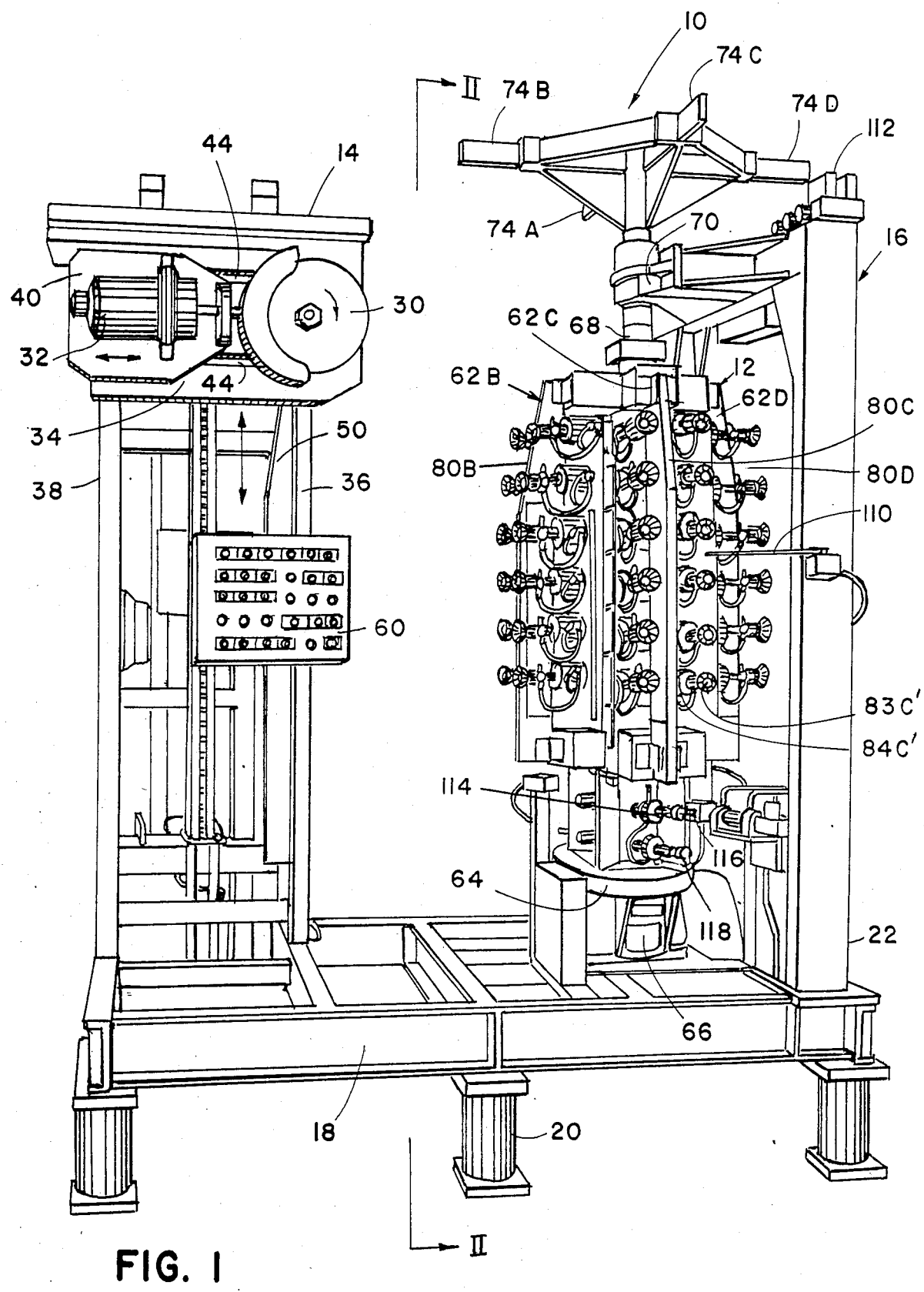
FIG. 1 is a perspective view of the novel machine.

Referring now to the drawings, the hog carcass splitting machine 10 includes a carousel subassembly 12 and a splitting subassembly 14, both cooperatively arranged on a supporting framework subassembly 16.

The supporting framework subassembly 16 includes a horizontal portion 18 and a vertical portion 22. More specifically, the horizontal platform 18 is mounted on a plurality of spaced underlying pillars 20, and constitutes a series of interconnected beams such as I-beams. Extending upwardly from one side thereof is the upright portion 22 shown to be basically of rectangular configuration formed of interconnected support members.

Figure 3:
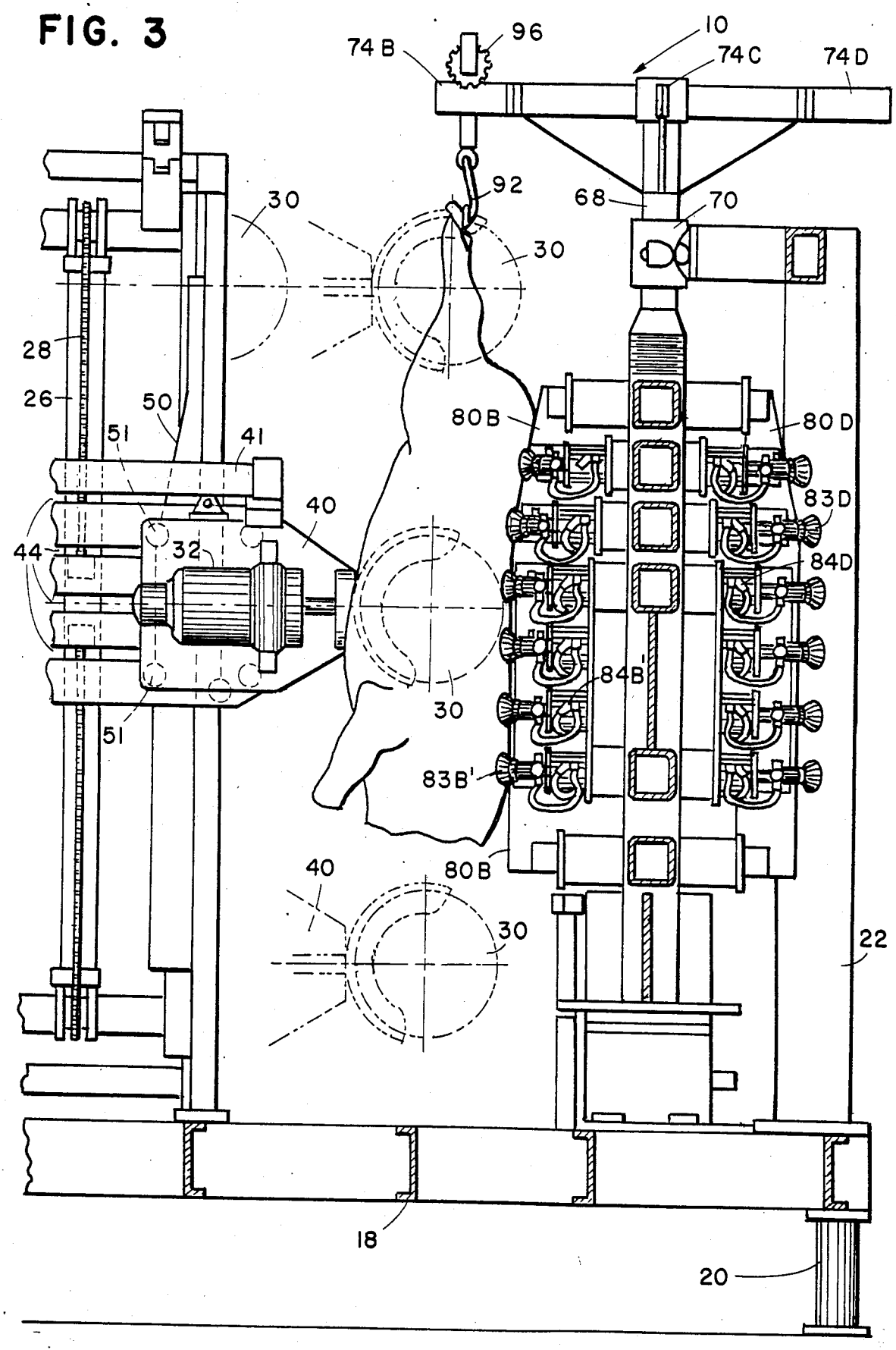
FIG. 3 is an elevational partially sectional view of the machine taken on plane III—III of FIG. 2 during a hog splitting operation.
Figure 4:
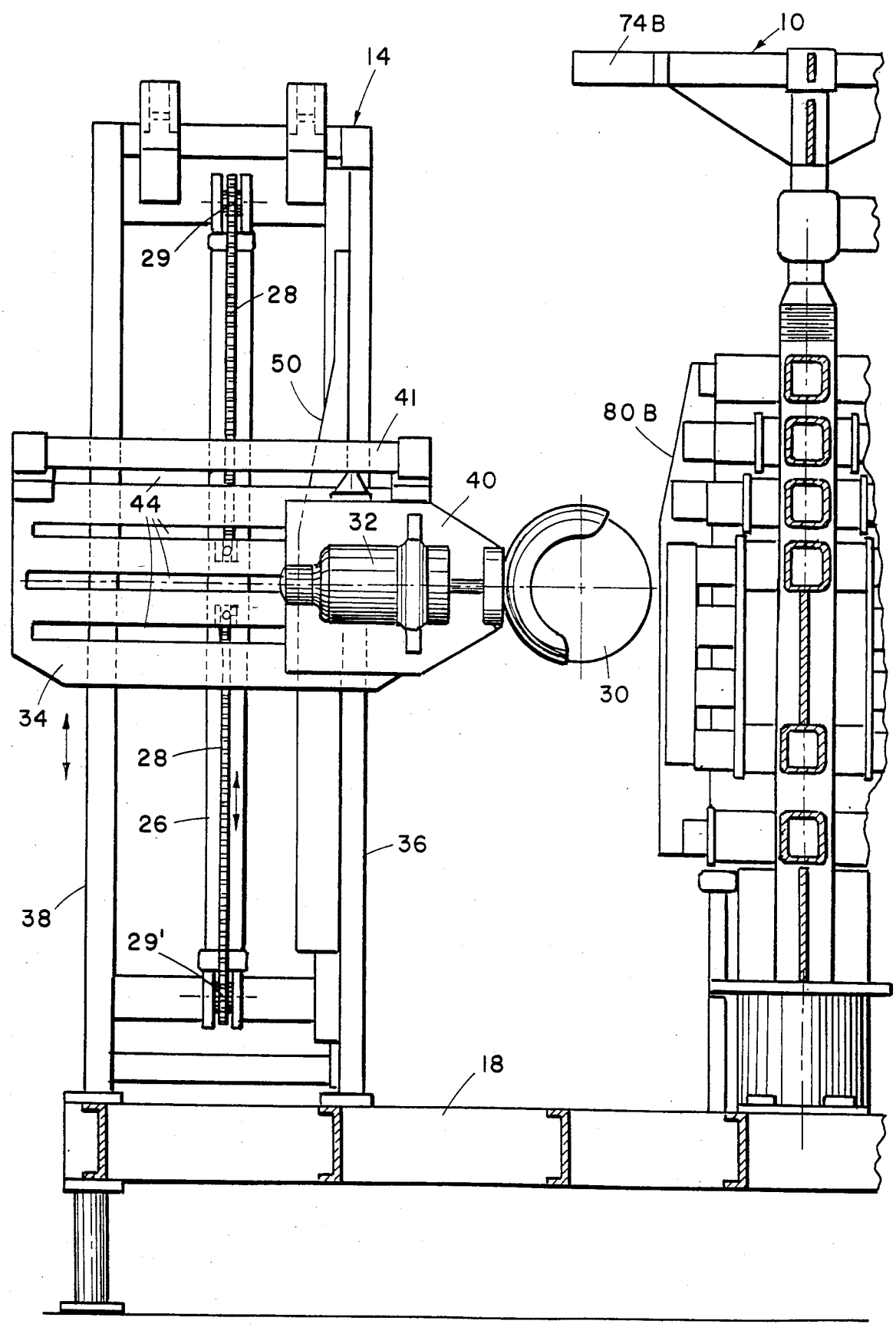
FIG. 4 is a fragmentary partially sectioned elevational view of the machine in FIG. 3 without the hog carcass in place.

Splitting subassembly 14 has as its main operative component a cutting element normally in the form of a circular cutting saw 30, driven by a motor 32, usually electric. Both are mounted on a trolley carriage 34 which travels vertically down and back up as guided by the two vertical ways 36 and 38, and powered by a suitable drive means which may be a chain or cable 28 actuated by a fluid cylinder 26 around sprockets or sheaves 29 and 29' (FIG. 4) or other mechanical, electromechanical, pneumatic or hydraulic means. Saw 30 and motor 32 are further supported on a subcarriage 40 supported on carriage 34 and movable horizontally toward and away from carousel subassembly 12 on horizontal guide tracks 44. This lateral movement is controlled by a vertically elongated configured cam surface 50 which has a diagonally tapered upper portion and a generally vertically straight lower portion, in combination with cam follower rollers 51 (FIG. 3) on subcarriage 40.

A control panel 60 with suitable actuator buttons for the splitting subassembly 14 is mounted on the support structure.

Carousel subassembly 12 is a multifaceted structure, here shown to include four facets. Each carousel is mounted on a turntable 64 at the bottom and shaft 68 at the upper end for rotation of the carousel about a central vertical axis through successive stations, namely an infeed station, a splitting station, an outfeed station and an intermediate cleanout station. This intermittent rotation is caused by motor 66 on a controlled basis. Upper end rotation shaft 68 is mounted in a bearing 70 secured to the upper end of support framework 22. At the upper end of shaft 68 is a trolley turntable which has a plurality of stub rails corresponding to the number of facets on the carousel. Therefore, in this four sided carousel depicted, there are four stub rails 74A, 74B, 74C and 74D corresponding to the carousel facets 62A, 62B, 62C and 62D respectively.

Each facet has a central configured vertically extending backstop ridge against which the carcass backbone region is pressed. That is, backstops 80A, 80B, 80C and 80D respectively extend to be placed in alignment with power saw 30 when at the splitting station, as is backstop 80B of facet 62B in FIG. 1. The configurated cam has a sloped or tapered upper portion and a generally vertically straight lower portion. The configuration basically matches the configuration of cam 50 which the power saw follows. This is to cause the outer cutting edge of the saw to move in a vertical configurated path a small controlled spacing from the backstop for completely severing the backbone of the carcass but without severing the adjacent skin.

Figure 2:
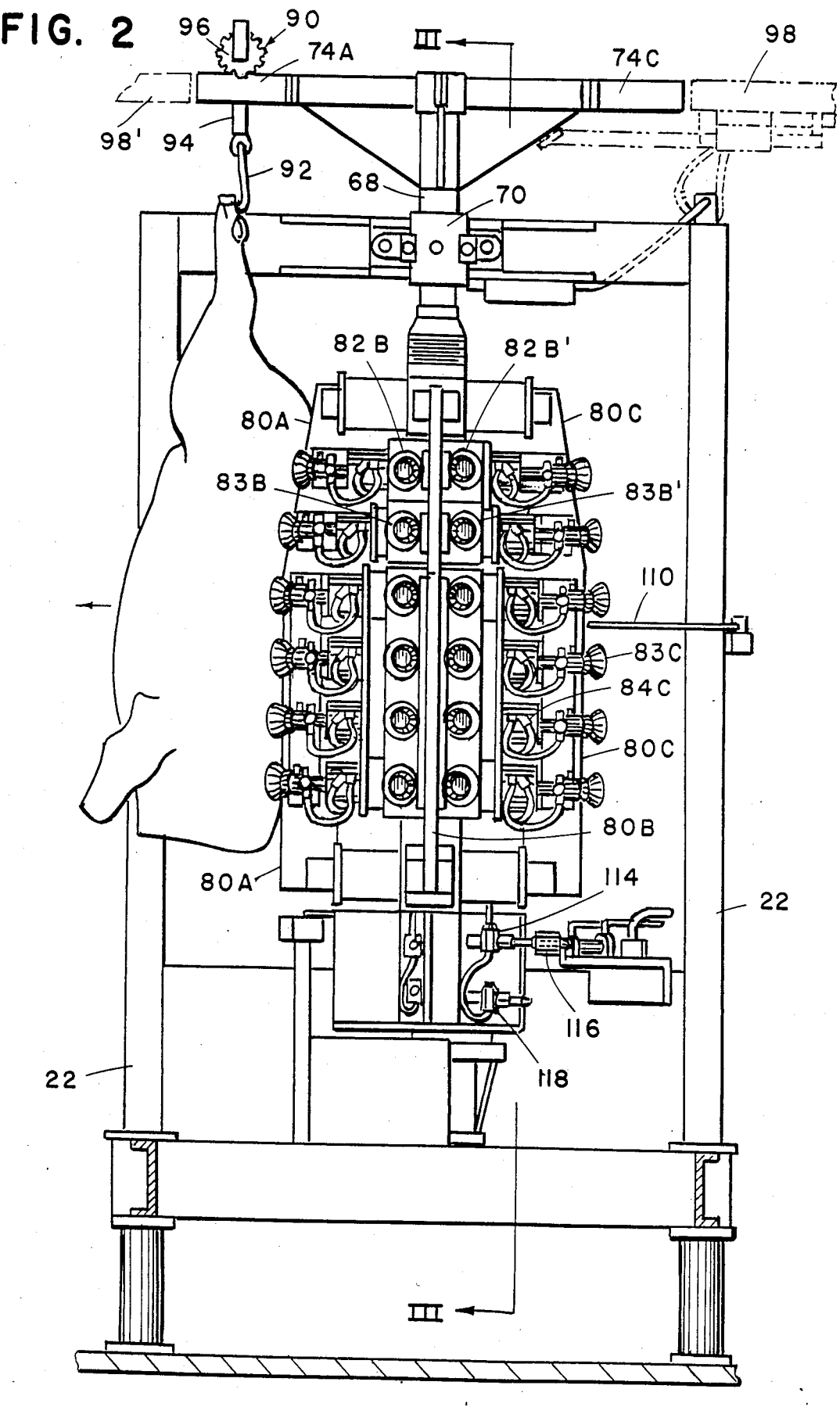
FIG. 2 is a side elevational view of a portion of the machine.

Straddling each of the configurated backstops 80A, 80B, 80C and 80D are two sets of retractable suction means. Specifically, each set, e.g., set 82B and set 82B' (FIG. 2), comprises a vertically spaced plurality (here six in number) of suction cups extending generally the length of the configurated cam, e.g., 80B (FIG. 2). Each suction cup, e.g., 83B or 83B', is mounted on the extended piston rod of a fluid cylinder to be laterally extensible toward the carcass, and retractable to pull the carcass toward the backstop For example, suction cups 83C and 83C' (FIGS. 1 and 2) mounted on fluid cylinders 84C and 84C' are hydraulically or pneumatically extensible and retractable. The individual suction cups on opposite sides of the configurated backstop are canted at an acute angle toward each other for optimum engagement with the curved surface of the two opposite side portions of the carcass when the carcass is centered on the backstop, with the backbone of the carcass adjacent the backstop.

The uppermost suction cups are offset relative to the lowermost suction cups so that retraction thereof will cause the upper portion of the carcass to retract against the upper tapered portion of the backstop.

Thus, engagement of the extended suction cups with the two side portions of the carcass, followed by activation of the suction to cause securement of the suction cups to the carcass, and retraction of the suction cups by the fluid cylinders, cause the carcass to be forcefully retracted for conformity of the backbone region of the carcass to the configurated backstop. This results in the upper portion of the inverted suspended carcass, i.e., the animal's lower backbone region, being retracted further into engagement with the upwardly outwardly tapered portion of the backstop as depicted in the drawings.

The suspension means for carrying a carcass to the apparatus may be conventional in nature. This suspension means 90 (FIG. 2) includes gam hooks 92 for suspending the hog by its rear gams, mounted on a bracket 94 suspended on a trolley 96 movable along a conventional infeed track 98 (shown in phantom in FIG. 2) on the infeed side of the conveyor and dischargeable along a conventional track 98' (FIG. 2) at the discharge station of the carousel. In the embodiment depicted, infeed track 98 is aligned with stub track 74C on the carousel, while outfeed track 98' is aligned with stub 74A on the carousel. Adjacent the infeed station is shown a whisker switch (FIG. 2) 110 engaged by an entering carcass to electrically interlock the system. At the top of the framework are solenoid valves 112 of suitatble type to control indexing of the machine. Adjacent the bottom of the carousel are valves 114 operated by a configurated cam track 116 for pulling and pushing the valves. This turns the vacuum on and off to respective suction cups. Additional solenoid valves 118 in the same region cause an air blast to be actuated in the fourth station of the carousel, to blow air through the cups and thereby clean out any debris therein.

In operation, a suspended hog carcass moving along the conveyor track 98 will transfer from track 98 onto aligned stub track 74C, simultaneously actuating whisker switch 110 as it engages the suction cups with the backbone of the carcass oriented toward the configurated stop 80C. Suction is then applied to the extended suction cups from a suitable vacuum source, e.g., vacuum pump and reservoir (not shown), to attach each of the suction cups in the two sets to the carcass and secure the two side portions of the hog carcass. Next the suction cup cylinders are retracted to pull the suction cups inwardly of the carousel and thereby draw the retained carcass toward the backstop, until the backbone region of the carcass is forcefully configurated to match the configurated backstop 80C. The carousel is then ready to advance to the next station, namely the backbone splitting station aligned with splitting saw 30. The saw is in its vertically elevated position depicted in FIG. 1. The carcass suspended on stub track 74C will then be in the position of 74B (FIG. 1) such that the plane of the vertically elongated backstop 80C is aligned with the plane of vertical movement of cutting saw 30. The cutting saw is laterally advanced toward and into the opened carcass toward the backbone from the interior thereof. Extension of the saw laterally toward the carcass is by movement of subcarriage 40 on carriage 34 by way of actuator 41. The saw is lowered by operation of vertical fluid cylinder 26 (FIG. 4) and chain 28 to lower carriage 34 and the saw. As the saw is lowered, its cam followers 51 (FIG. 3) follow cam track 50 to cause a controlled depth cut which severs the backbone but stops short of the skin which lies immediately against the backstop. This leaves the skin in one full piece rather than severed into two halves. (The transverse and vertical movements of cutting saw 30 are depicted diagrammatically by phantom lines in FIG. 3.) When the saw reaches the bottom of the inverted carcass, i.e., the neck region, it retracts laterally by retraction of subcarriage 40 on carriage 34, and then retracts vertically to its original position at the top by elevating carriage 34. As the splitting function occurs in this splitting station, a second carcass on another suspension means enters the infeed station from track 98 in the manner described above. After the cutting saw has made a full cut, a water spray preferably is forcefully ejected onto it to clean it for the next cut. Suitable limit switches (not shown) then actuate the carousel for advancing the split carcass to the discharge station while the respective suction means retains the two half portions. At the discharge station, the vacuum is released on the suction cups to enable the carcass to be discharged on its suspension means onto discharge track 98' for movement to the next processing step. While this discharge is occurring, the succeeding carcass is being split, and the next succeeding carcass is being loaded at the infeed station. When the carousel moves from the dischange station to the cleanout station, which is between the discharge station and the infeed station, a blast of air from a suitable air supply means (not shown) is caused to blow through these suction cups to clean out any debris therein.

Based upon testing conducted in packing house conditions, the novel apparatus has been found particularly effective, enabling the operator to sequentially perform the splitting operation on successive hog carcasses rapidly, safely and to a controlled depth.

Conceivably certain features of the machine as set forth in its illustrative preferred embodiment herein could be modified to suit a particular situation or packing house environment. Hence, the invention is intended to be limited only by the scope of the claims appended hereto, and the reasonable equivalents thereto.

The embodiments of the invention in which an exclusive property or privilege is claimed are defined as follows:

1. A carcass back splitting machine comprising:
   a carcass back splitting saw movable vertically through a splitting motion;
   a multifaceted carcass supporting carrousel including a plurality of facets, each having carcass receiving and retention means for receiving and retaining a carcass to be advanced by said carrousel;
   said carrousel being rotatable through successive stations including a carcass entry station, a carcass splitting station and a carcass discharge station;
   said carcass splitting saw being aligned with said carcass splitting station and advanceable to split the backbone of a carcass thereat;
   said carcass receiving and retention means at each said facet including two lateral sets of suction means for respectively engaging the two side portions of a carcass and retaining the engagement from said carcass entry station through said carcass splitting station to said carcass discharge station;
   each set of suction means comprising a series of suction cups, a vacuum source means operably connected to said suction cups for applying vacuum suction thereto;
   a series of retractors supporting said suction cups and operable to retract said suction cups and a carcass engaged thereby; and
   control means responsive with rotation of said carrousel for actuating vacuum suction to said suction cups at said entry station and causing them to retract, for retaining said suction and retention at said splitting station, and for deactuating said vacuum suction and retraction at said discharge station.

2. A carcass back splitting machine comprising:
   a carcass back splitting saw movable vertically through a splitting motion;
   a multifaceted carcass supporting carrousel including a plurality of facets, each having carcass receiving and retention means for receiving and retaining a carcass to be advanced by said carrousel;
   said carrousel being rotatable through successive stations including a carcass entry station, a carcass splitting station and a carcass discharge station;
   said carcass splitting saw being aligned with said carcass splitting station and advanceable to split the backbone of a carcass thereat;
   said carcass receiving and retention means at each said facet including two lateral sets of suction means for respectively engaging the two side portions of a carcass and retaining the engagement from said carcass entry station through said carcass splitting station to said carcass discharge station;
   each set of suction means comprising a series of suction cups, a vacuum source means operably connected to said suction cups for applying vacuum suction thereto;
   a series of retractors supporting said suction cups and operable to retract said suction cups and a carcass engaged thereby;
   control means responsive with rotation of said carrousel for actuating vacuum suction to said suction cups at said entry station and causing them to retract, for retaining said suction and retention at said splitting station, and for deactuating said vacuum suction and retraction at said discharge station;
   a configurated vertical backstop for engagement of the backbone region of a suspended carcass retracted against said backstop by said retracted suction cups; and
   a vertical configurated cam for said saw to guide said saw in a pattern matching the configuration of said backstop, for severing the backbone of each retained, retracted carcass when it is advanced by said carrousel to said splitting station, without severing the adjacent skin.

3. A carcass back splitting machine comprising:
   a carcass back splitting saw;
   a carcass suspension support;
   carcass receiving and retention means comprising two sets of laterally spaced suction cups, a straddle of a saw receiving zone, each said set of suction cups being arranged vertically;
   vertically oriented configurated carcass stop means between said sets for cooperation with said suction cups to position a carcass in a predetermined configuration;

said suction cups being retractable to shift the carcass into abutment with said carcass stop means;

said carcass splitting saw being movable vertically through a carcass splitting motion; and including cam guide means for said saw for varying the cutting depth of said saw over the length of the carcass to retain said saw a set distance from said stop means;

said carcass stop means and said cam guide means having like configurations to cause said saw to remain at said controlled spacing from said carcass stop means and thereby cause said saw to split the carcass backbone without splitting the adjacent skin.

* * * * *